United States Patent
Zhu et al.

(10) Patent No.: US 10,768,034 B2
(45) Date of Patent: Sep. 8, 2020

(54) MEASUREMENT SENSOR OF THE VIBRATIONAL TYPE FOR MEASURING THE DENSITY AND/OR THE MASS FLOW OF A FLOWING MEDIUM

(71) Applicant: Endress+Hauser Flowtec AG, Reinach (CH)

(72) Inventors: Hao Zhu, Freising (DE); Alfred Rieder, Landshut (DE); Ennio Bitto, Aesch (CH); Gerhard Eckert, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/471,656

(22) PCT Filed: Nov. 22, 2017

(86) PCT No.: PCT/EP2017/080084
§ 371 (c)(1),
(2) Date: Jun. 20, 2019

(87) PCT Pub. No.: WO2018/114198
PCT Pub. Date: Jun. 28, 2018

(65) Prior Publication Data
US 2019/0383656 A1 Dec. 19, 2019

(30) Foreign Application Priority Data
Dec. 23, 2016 (DE) .................. 10 2016 125 616

(51) Int. Cl.
*G01F 1/84* (2006.01)
*G01N 9/00* (2006.01)
(52) U.S. Cl.
CPC .......... *G01F 1/8413* (2013.01); *G01F 1/8477* (2013.01); *G01N 9/002* (2013.01)

(58) Field of Classification Search
None
See application file for complete search history.

(56) References Cited

U.S. PATENT DOCUMENTS

2001/0035055 A1* 11/2001 Drahm .................. G01F 1/8413
73/861.355
2006/0016273 A1 1/2006 Bitto et al.
(Continued)

FOREIGN PATENT DOCUMENTS

DE 102004035971 A1 2/2006
DE 102009055069 A1 6/2011
(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a measurement sensor of the vibrational type for measuring the density and/or the mass flow of a medium, including: two oscillators; an exciter for stimulating oscillator vibrations; and two vibration sensors, wherein the first oscillator includes first and second measuring tubes and a first resilient vibration coupler for coupling the measuring tubes, wherein the second oscillator includes third and fourth measuring tubes and a second resilient vibration coupler for coupling the third and fourth measuring tubes, wherein perpendicularly to a measuring tube transverse plane a measurement sensor longitudinal plane extends between the third and the fourth measuring tube, wherein the first and third measuring tube relative to a measurement sensor longitudinal plane are in mirror symmetry relative to one another, and wherein the second and fourth measuring tube relative to the measurement sensor longitudinal plane are in mirror symmetry relative to one another.

11 Claims, 4 Drawing Sheets

(56) References Cited

U.S. PATENT DOCUMENTS

2012/0167697 A1 7/2012 Rieder et al.
2012/0279317 A1 11/2012 Bitto et al.
2015/0033874 A1 2/2015 Wang et al.

FOREIGN PATENT DOCUMENTS

DE 102011010178 A1 8/2012
DE 102015104931 A1 6/2016

* cited by examiner

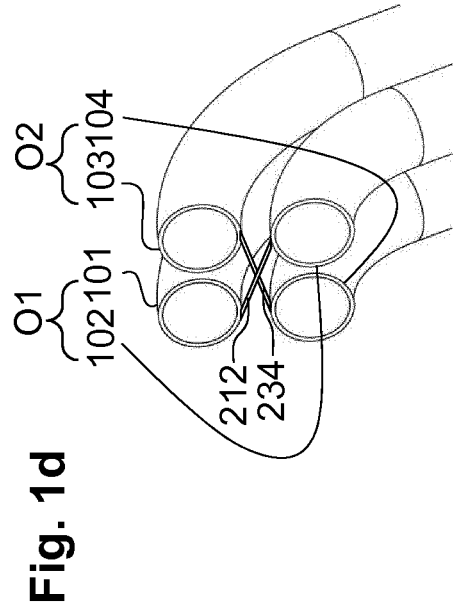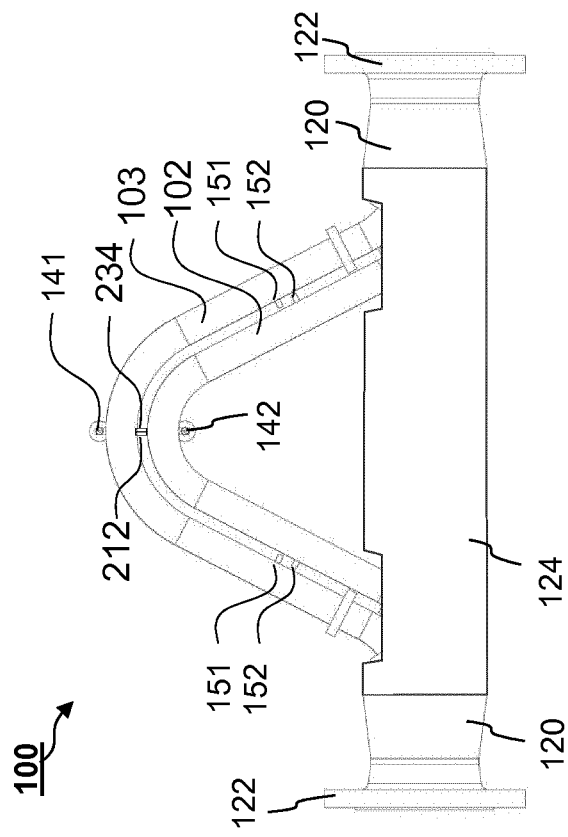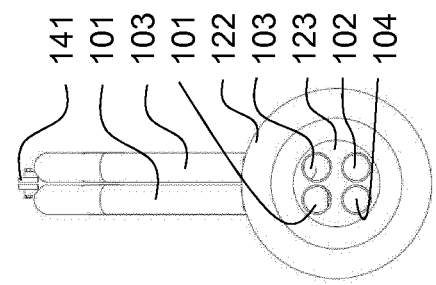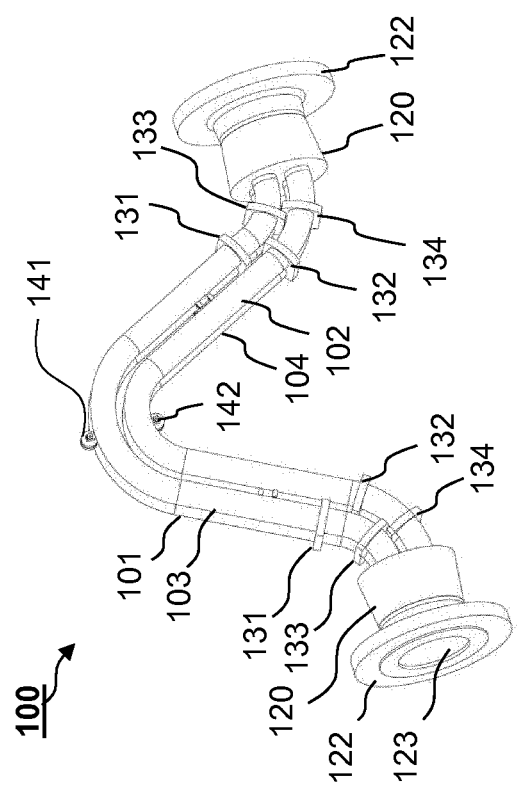

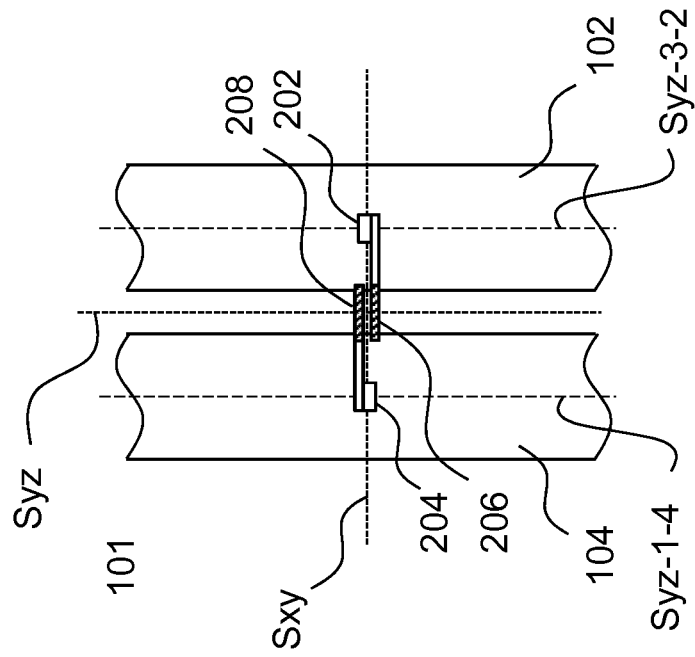
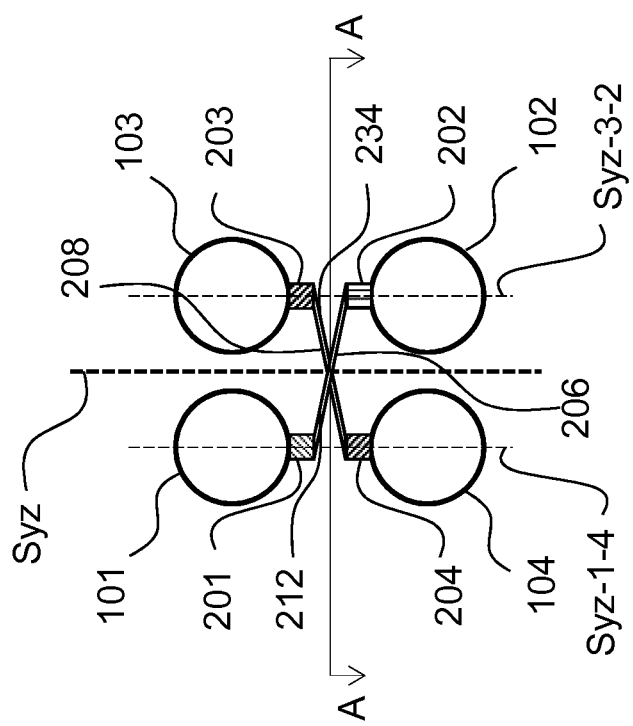
Fig. 3a
Fig. 3b

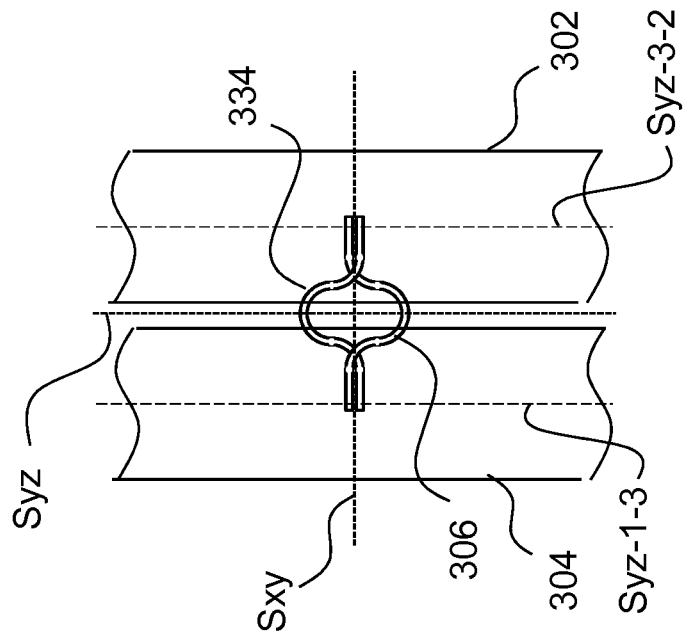
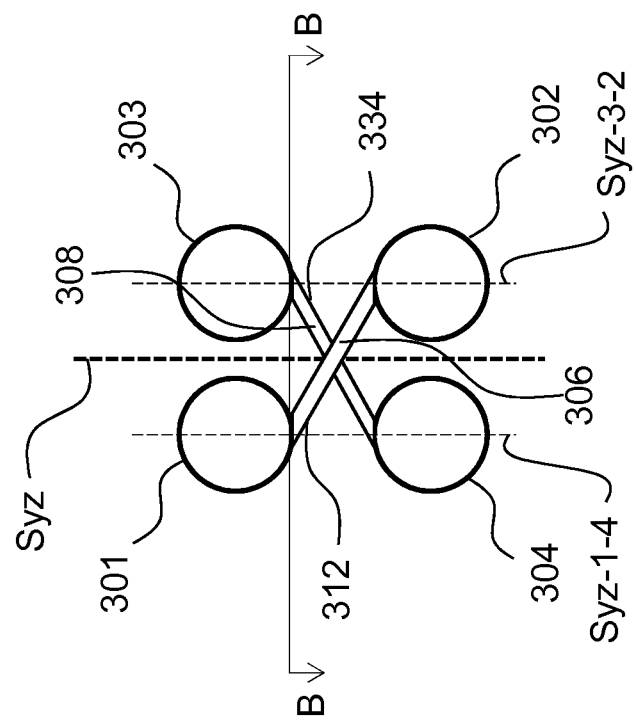
Fig. 4b
Fig. 4a

MEASUREMENT SENSOR OF THE VIBRATIONAL TYPE FOR MEASURING THE DENSITY AND/OR THE MASS FLOW OF A FLOWING MEDIUM

CROSS-REFERENCE TO RELATED APPLICATIONS

The present application is related to and claims the priority benefit of German Patent Application No. 10 2016 125 616.1, filed on Dec. 23, 2016, and International Patent Application No. PCT/EP2017/080084 filed on Nov. 22, 2017, the entire contents of which are incorporated herein by reference.

TECHNICAL FIELD

The present invention relates to a measurement sensor of the vibrational type for measuring the density and/or mass flow of a medium, in particular such a measurement sensor with four measuring tubes bent in the same direction.

BACKGROUND

Published patent application DE 10 2011 010 178 A1 discloses such a measurement sensor. The measuring tubes are coupled to oscillators in pairs, wherein two superposed measuring tubes form an oscillator. The coupling over the respective distance, however, is highly rigid, so that large constraining forces and mechanical stresses between the coupled measuring tubes are to be expected; these affect the accuracy and sensitivity of the measurement sensor in a foreseeable manner. It is therefore the object of the invention to remedy this situation.

SUMMARY

The object is achieved by the measurement sensor according to independent claim 1.

The invention discloses a measurement sensor of the vibrational type for measuring the density and/or flow of a medium having:
a first oscillator; a second oscillator; and at least one exciter, and at least two vibration sensors, wherein the first oscillator comprises:
a first measuring tube, having a first measuring tube center line which extends in mirror symmetry to a measuring tube transverse plane, wherein the first measuring tube is configured to oscillate in a first bending vibration mode in mirror symmetry relative to the first measuring tube transverse plane,
wherein the first measuring tube is bent in its rest position,
wherein a first measuring tube longitudinal plane is given, in which the integral over the square of the distance between the first measuring tube center line and the first measuring tube longitudinal plane is minimal,
wherein the first measuring tube in the first bending vibration mode oscillates substantially perpendicular to the first measuring tube longitudinal plane,
a second measuring tube, having a second measuring tube center line which extends in mirror symmetry relative to the measuring tube transverse plane, wherein the second measuring tube is configured to oscillate in the first bending vibration mode in mirror symmetry relative to the first measuring tube transverse plane,
at least one first resilient vibration coupler coupling the first measuring tube and the second measuring tube together to the first oscillator; and
wherein the second measuring tube is bent in its rest position,
wherein a second measuring tube longitudinal plane is given, in which the integral over the square of the distance between the second measuring tube center line and the second measuring tube longitudinal plane is minimal,
wherein the second measuring tube in the first bending vibration mode oscillates substantially perpendicular to the second measuring tube longitudinal plane,
wherein the first measuring tube and the second measuring tube are bent in the same direction in the rest position,
wherein the second oscillator comprises:
a third measuring tube having a third measuring tube center line which extends in mirror symmetry relative to the measuring tube transverse plane, wherein the third measuring tube is configured to oscillate in a first bending vibration mode in mirror symmetry relative to the measuring tube transverse plane;
a fourth measuring tube, having a fourth measuring tube center line, which extends in mirror symmetry relative to the measuring tube transverse plane, wherein the fourth measuring tube is configured to oscillate in the first bending vibration mode in mirror symmetry relative to the measuring tube transverse plane; and
at least one second resilient vibration coupler coupling the third measuring tube and the fourth measuring tube to the second oscillator,
wherein the third measuring tube is bent in its rest position,
wherein a third measuring tube longitudinal plane is given, in which the integral over the square of the distance between the third measuring tube center line and the third measuring tube longitudinal plane is minimal,
wherein the third measuring tube in the first bending vibration mode oscillates substantially perpendicular to the third measuring tube longitudinal plane,
wherein the fourth measuring tube is bent in its rest position, wherein a fourth measuring tube longitudinal plane is given, in which the integral over the square of the distance between the fourth measuring tube center line and the fourth measuring tube longitudinal plane is minimal, wherein the fourth measuring tube oscillates in the first bending vibration mode substantially perpendicular to the fourth measuring tube longitudinal plane,
wherein the third measuring tube and the fourth measuring tube are bent in the same direction in their rest position,
wherein the measurement sensor has a measurement sensor longitudinal plane extending perpendicular to the measuring tube transverse plane,
wherein the first measuring tube center line extends in mirror symmetry relative to the third measuring tube center line with respect to the measurement sensor longitudinal plane,
wherein the second measuring tube center line extends in mirror symmetry relative to the fourth measuring tube center line with respect to the measurement sensor longitudinal plane,
wherein the measurement sensor longitudinal plane extends between the first measuring tube and the second measuring tube, wherein the measurement sensor longitudinal plane extends between the third measuring tube and the fourth measuring tube,
wherein the exciter is configured to excite oscillator vibrations of the two oscillators with respect to one another.

In a development of the invention, the first vibration coupler has a first effective spring constant, wherein the second vibration coupler has a second effective spring constant, wherein the second spring constant deviates from the first spring constant by not more than 6%, particularly not more than 3% and preferably not more than 1%.

In a development of the invention, the first vibration coupler has a first natural frequency for a vibration mode, with which the two measuring tubes of the first vibration coupler oscillate approximately in phase in the first bending vibration mode and with which the two measuring tubes of the second oscillator oscillate approximately in phase in the first bending vibration mode, wherein the measurement sensor has a second natural frequency for a vibration mode with which the two measuring tubes of the first oscillator oscillate in approximately opposite phase, and with which the two measuring tubes of the second oscillator oscillate approximately in phase opposition in the first bending vibration mode, wherein the second natural frequency is greater than the first natural frequency.

In a development of the invention, the second natural frequency is higher by at least 4%, particularly at least 8%, preferably at least 16%, of the first natural frequency than the first natural frequency.

In a development of the invention, the first measuring tube and the third measuring tube without the resilient vibration couplers have a first effective measuring tube natural frequency for the first bending vibration mode if they oscillate against each other, wherein the second measuring tube and the fourth measuring tube without the resilient vibration couplers have a second effective measuring tube natural frequency for the first bending vibration mode if they oscillate against each other, wherein the two center measuring tube natural frequencies differ by not more than 8%, particularly not more than 4% and preferably not more than 2% and particularly preferably not more than 1% of their arithmetic mean.

In a development of the invention, the measuring tube longitudinal planes are inclined relative to the measurement sensor longitudinal plane by not more than 8°, particularly not more than 4°, preferably not more than 2°, and particularly preferably not more than 1°.

In a development of the invention, at least one, preferably both, of the resilient vibration couplers are connected to the measuring tubes coupled by it or them, at attachment points which are arranged symmetrically with respect to the measuring tube transverse plane.

In a development of the invention, the measurement sensor furthermore comprises a collector on the inlet side and on the outlet side, wherein the measuring tubes are each fluidically combined with a collector on the inlet side and on the outlet side; wherein the collectors are designed particularly such that they fulfill the functionality of a node plate; and a carrier body which rigidly connects the inlet-side collector and the outlet-side collector.

In a development of the invention, the measurement sensor further comprises on each of the inlet side and outlet side at least one node plate, preferably two or a plurality of node plates, wherein the measuring tubes are connected to each other on each of the inlet side and outlet side at least by means of at least one node plate with measuring tube longitudinal planes symmetrical with respect to the measurement sensor longitudinal plane.

In a development of the invention, each of the vibration couplers couples only two measuring tubes to one another.

In a development of the invention, there is no direct connection between the two vibration couplers.

In a development of the invention, a rest position distance from attachment points of a vibration coupler to the measuring tubes coupled by means of the vibration coupler at temperatures between 20° C. to 80° C. has a change coefficient that differs not more than 50%, particularly not more than 20%, preferably not more than 10% from the thermal expansion coefficient of the material of the vibration coupler.

BRIEF DESCRIPTION OF THE DRAWING

The invention is described in the following in further detail on the basis of the exemplary embodiments shown in the figures. These show:

FIG. 1a shows a spatial representation of a first exemplary embodiment of a measurement sensor according to the present disclosure;

FIG. 1b shows a side view of the first exemplary embodiment of a measurement sensor according to the present disclosure;

FIG. 1c shows a front view of the first exemplary embodiment of a measurement sensor according to the present disclosure;

FIG. 1d shows a detail view of the first exemplary embodiment of a measurement sensor according to the present disclosure;

FIG. 3a shows a detail cross-section in the measuring tube transverse plane in the area of the vibration coupler of a first exemplary embodiment;

FIG. 3b shows a detail plan view along the line A-A of FIG. 3a on the second and fourth measuring tubes of the first exemplary embodiment;

FIG. 4a shows a detail cross-section in the measuring tube transverse plane in the area of the vibration coupler of a second exemplary embodiment; and FIG. 4b shows a detail plan view along the line B-B of FIG. 4a on the second and fourth measuring tube of the second exemplary embodiment.

DETAILED DESCRIPTION

Figure 2B:
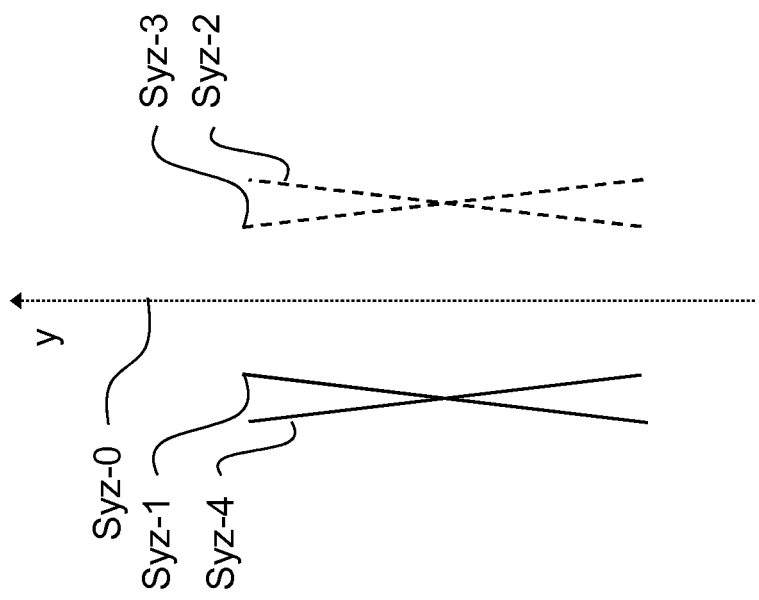
FIG. 2b illustrates general symmetry conditions of a measurement sensor according to the present disclosure.

The exemplary embodiment of a measurement sensor 100 according to the invention shown in FIGS. 1a to 1d comprises four bent measuring tubes 101, 102, 103, 104. The measuring tubes 101, 102, 103, 104 extend between an inlet-side collector 120 and an outlet-side collector 120, and are firmly connected to the collectors 120, for example by rolling, brazing or welding. Extending between the collectors 120 is a solid support tube 124 firmly connected to both collectors, thereby rigidly coupling the collectors 120 with each other. The support tube 124 has openings on its upper side through which the measuring tubes 101, 102, 103, 104 are guided out of the support tube 124 and back by the collectors 120.

Each of the collectors 120 has a flange 122 at its ends, by means of which the measurement sensor 100 is to be installed in a tube line. Through openings 123 in the flanges 122 a medium can be guided through the measurement sensor 100, in particular its measuring tubes 101, 102, 103, 104 in order to determine the mass flow and/or the density of the medium. The first measuring tube 101 and the second measuring tube 102 are coupled to a first oscillator O1 by means of a first vibration coupler 212. The third measuring tube 103 and the fourth measuring tube 104 are coupled to a second oscillator O2 by means of a second vibration coupler 234 (for the sake of clarity, the vibration couplers are not shown in FIG. 1a).

Figure 2A:
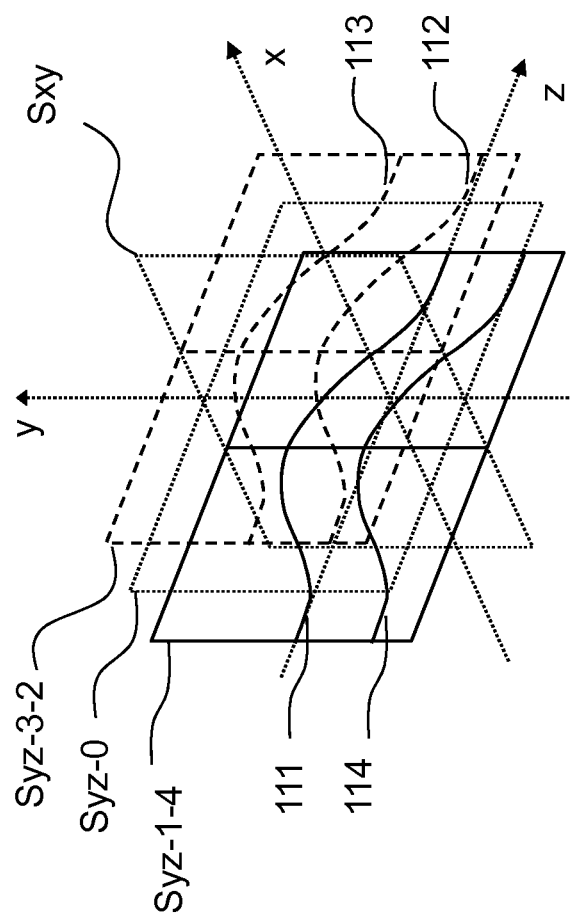
FIG. 2a illustrates symmetries of a preferred exemplary embodiment of a measurement sensor according to the present disclosure.

Before the operation of the measurement sensor 100 according to the invention is described further, reference is made briefly to FIGS. 2a and 2b for describing some symmetry properties of the measurement sensor according to the invention. FIG. 2a shows a first measuring tube center line 111 of the first measuring tube 101, a second measuring tube center line 112 of the second measuring tube 102, a third measuring tube center line 113 of the third measuring tube 103, and a fourth measuring tube center line of the fourth measuring tube 104. Each of the measuring tube center lines are opposite each other through the centers of a series of tube cross-sections along the course of a measuring tube.

Each of the measuring tubes 101, 102, 103, 104 is assigned a measuring tube longitudinal plane Syz–1, Syz–2, Syz–3, Syz–4, to which the integral over the square of the distance of the respective measuring tube center line is minimal. In particular, the measuring tube center lines can extend completely in the respective measuring tube longitudinal plane.

The measuring tube longitudinal planes Syz 1, Syz 2, Syz 3, Syz 4 intersect the measuring tube transverse plane Sxy perpendicularly, as shown in FIG. 2b, which shows a plan view of the measuring tube transverse plane. In the general case shown therein, each measuring tube has its own measuring tube longitudinal plane Syz–1, Syz–2, Syz–3, Syz–4, wherein the measuring tube transverse planes can certainly coincide in pairs, as shown in FIG. 2a for the symmetries of the exemplary embodiment of FIGS. 1a to 1d. Accordingly, the first and fourth measuring tube longitudinal planes lie in a common measuring tube longitudinal plane Syz–1–4 and the third and the second measuring tube longitudinal planes lie in a common measuring tube longitudinal plane Syz–3–2.

Each of the measuring tube center lines 111, 112, 113, 114 extends symmetrically to a common measuring tube transverse plane Sxy, which is accordingly cut perpendicularly by the measuring tube center lines. The first measuring tube center line 111 and the third measuring tube center line 113 extend symmetrically to each other with respect to a measuring tube longitudinal plane Syz–0. The second measuring tube center line 112 and the fourth second measuring tube center line 114 also extend symmetrical to each other with respect to the measurement sensor longitudinal planes Syz–0.

In the first exemplary embodiment, the measuring tube longitudinal planes Syz–1, Syz–2, Syz–3, Syz–4 extend parallel to the measurement sensor longitudinal plane Syz–0.

The cutting line between the measuring tube transverse plane Sxy and the measurement sensor longitudinal plane Syz–0 defines a Y axis of a coordinate system for describing the measurement sensor. A Z axis of the coordinate system is perpendicular to the measuring tube transverse plane and intersects the Y axis in the common origin. The X axis extends perpendicular to the other axes and intersects them in the common origin. With the coordinates defined as such, we turn to FIGS. 1a to 1d.

The first measuring tube 101 and the third measuring tube 103 are each connected to two nodal plates 131 and 133 on the inlet side and the outlet side, wherein the position of the two inner of the nodal plates 131, that is, those which are located on the inlet side and outlet side respectively furthest from the corresponding collector 120, defines free oscillation lengths of the first measuring tube 101 and the third measuring tube 103. Correspondingly, the second measuring tube 102 and the fourth measuring tube 104 are connected on the inlet side and on the outlet side respectively to two nodal plates 132 and 134, wherein the position of the two inner of the nodal plates 132 defines free oscillation lengths of the second measuring tube 102 and of the fourth measuring tube 104. Due to the symmetries, each of the measuring tubes extending symmetrical to each other with respect to the transducer longitudinal plane has the same oscillation length and thus, with the exception of minimal deviations due to manufacturing tolerances, the same oscillation properties. In other words, without the vibration couplers 212, 234, they would have, for example, essentially the same natural frequencies in pairs, which are respectively defined particularly by the free oscillation lengths of the measuring tubes. Insofar as the second and the fourth measuring tubes 102, 104 have a different shape than the first and the third measuring tube, 101, 103, the two pairs of measuring tubes have different oscillation properties and particularly different natural frequencies, wherein the aim is to keep the differences as minimal as possible. Due to the coupling of the measuring tubes by the two vibration couplers 212, 234 to the first and second oscillators O1, O2, the measuring tubes oscillate in bending vibration modes of the oscillators resulting from coupling the bending vibration modes of the measuring tubes involved. The bends have natural frequencies that differ from those of the bending vibration modes of the coupled measuring tubes.

The so-called use mode, i.e. that bending vibration mode in which measuring tubes are usually excited in a generic measurement sensor, splits by the coupling of the measuring tubes in two bending vibration modes of the oscillators, oscillator vibration modes in short. In a first oscillator vibration mode, the first oscillator O1 oscillates against the second oscillator O2, with the two measuring tubes of an oscillator each oscillating in phase, i.e. moving simultaneously in the positive X direction. In a second oscillator vibration mode, the first oscillator O1 oscillates against the second oscillator O2, with the two measuring tubes of an oscillator each oscillating in phase opposition, i.e. moving simultaneously in the opposite X direction. The second oscillator vibration mode has a higher natural frequency than the first oscillator vibration mode. The extent to which the natural frequencies of the first and second oscillator vibration modes differ from one another depends on the rigidity of the vibration couplers in relation to the rigidity of the measuring tubes. Design options for this are shown below. In either case, the frequency separation should be a multiple of a resonant width of the oscillator vibration modes to prevent crosstalk between the oscillator vibration modes. The coupling of the measuring tubes to two oscillators causes the measuring tubes to oscillate in defined phases relative to each other, and the vibration modes not interfering with each other.

A first embodiment of vibration couplers is shown in FIGS. 3a and 3b. FIG. 3a shows a simplified cross-section of the measuring tubes 101, 102, 103, 104 in the measuring tube transverse plane. A first vibration coupler 212 extends diagonally from the vertex of the first measuring tube 101 to the vertex of the second measuring tube 102. The first vibration coupler 212 comprises a first straight coupler strip 206 extending between a first coupler foot 201 and a second coupler foot 202. The first and second coupler feet 201, 202 are fixed at the vertex of the first measuring tube 101 and the vertex of the second measuring tube 202 by means of joining, in particular welding or brazing. The first coupling strip 206 is either formed in one piece with the associated coupler feet 201, 202 or connected by joining with these.

A second vibration coupler 234 extends diagonally from the vertex of the third measuring tube 103 to the vertex of the fourth measuring tube 104. The second vibration coupler 234 comprises a second straight coupling strip 206 extending between a third coupler foot 203 and a fourth coupler foot 204. The third and fourth coupler foots 203, 204 are fixed at the vertex of the third measuring tube 103 and the vertex of the fourth measuring tube 204 by means of joining, in particular welding or brazing. The second coupling strip 206 is either formed in one piece with the associated coupler feet 203, 204 or connected by joining with these. The plan view of the third and fourth measuring tubes 103, 104 shown in FIG. 3b from the plane A-A in FIG. 3a shows the position of the second and fourth coupler foot 102, 104 and the course of the coupling strips 206, 208 below the plane A-A. The coupling strips 206, 208 are spaced from each other to exclude friction between them, but they are positioned as close as possible to the measuring tube transverse plane to minimize the introduction of bending moments, which could influence in particular the so-called Coriolis mode. The vibration couplers are made of a metallic material, preferably of the same material as the measuring tubes. For the sake of clarity, oscillation exciters, which are likewise positioned in the measuring tube transverse plane, are not shown in FIG. 3a.

A second embodiment of vibration couplers is shown in FIGS. 4a and 4b. FIG. 4a shows a simplified cross-section of the measuring tubes 301, 302, 303, 304 in the measuring tube transverse plane. A first vibration coupler 312 extends diagonally from the vertex of the first measuring tube 301 to the vertex of the second measuring tube 302. The first vibration coupler 312 comprises a first arc-shaped coupler strip 306, which is fixed with its ends at the vertex of the first measuring tube 301 and the vertex of the second measuring tube 302 by means of joining, in particular welding or brazing.

A second vibration coupler 334 extends diagonally from the vertex of the third measuring tube 303 to the vertex of the fourth measuring tube 304. The second vibration coupler 334 comprises a second arc-shaped coupling strip 308, which is fixed with its ends at the vertex of the third measuring tube 303 or the vertex of the fourth measuring tube 304 by means of joining, in particular welding or brazing. The plan view of the second and fourth measuring tubes 302, 304 shown in FIG. 3b from the plane B-B in FIG. 4a shows the course of the two coupling strips 306, 308 below the plane B-B. The arc-shaped course of the coupling strips 306, 308 makes it possible to guide the coupling strips past each other, and nevertheless positions the ends of the coupling strips in or near the measuring tube transverse plane in order to minimize the introduction of bending moments, which could influence in particular the so-called Coriolis mode. The vibration couplers 312, 334 are made of a metallic material, preferably of the same material as the measuring tubes. For the sake of clarity, oscillation exciters, which are likewise positioned in the measuring tube transverse plane, are not shown in FIG. 4a. By designing the bent course of the coupling strips 306, 308, the rigidity of the vibration couplers can be controlled. Thus, frequency separation between the first and second oscillator vibration modes can be set to a desired value. In addition, mechanical stress peaks can be avoided, in particular in the second oscillator vibration mode.

Preferably, the measurement sensor is operated in the first oscillator vibration mode, which stresses to a lower extent the material of the vibration coupler and the associated fasteners on the measuring tube, whereby particularly the risk of plastic deformation in the area of the vibration couplers is significantly reduced. In principle, however, the measurement sensor can also be operated in the second oscillator vibration mode, in particular for diagnostic purposes.

In the presentation of the present invention, with regard to the definition of an in-phase-opposition and an in-phase oscillation, the constraint is an arbitrary determination based on the diagonal course of the vibration couplers. What takes place from the perspective of a respective vibration coupler in phase (simultaneous movement in the positive x-direction) is in phase opposition with respect to the measurement sensor longitudinal plane (the first and the third measuring tubes approach each other, while the fourth and the second measuring tubes are moving away from each other). In the present case, the decision was made to call the low-frequency, lower-stress first oscillator vibration mode "in phase." However, an advantage of the invention lies precisely in this ambiguity of the phase relationship due to the diagonal coupling. This is because, in the preferred first oscillator vibration mode, from the perspective of the collector 120, the outer measuring tube pair which is formed from the first and third measuring tubes 101, 103 oscillates in phase relative to the inner pair of measuring tubes, which is formed from the second and fourth measuring tubes 102, 104. Therefore, if, for example, stresses acting on the collectors from one of the pairs of measuring tubes extend in the X-direction, opposite stresses will arise at the same time from the other pair of measuring tubes so that they at least partially compensate each other. In this way, the dissipation of oscillation energy in the collector or a tube line connected during the use of the measurement sensor is minimized. Accordingly, this can also reduce the coupling of disturbances via the collector.

For exciting the bending vibrations of the measuring tubes of the oscillators O1 and O2 in the X direction, an electrodynamic exciter arrangement 141 is arranged in the measuring tube transverse plane Sxy between the first measuring tube 101 and the third measuring tube 103. The exciter arrangement 141 comprises a plunger coil on one of the two measuring tubes and a plunger on the opposite measuring tube. The exciter arrangement is positioned at the vertexes of the first and third measuring tubes in the measuring tube transverse plane. Furthermore, a second electrodynamic exciter arrangement 142 is provided, which acts between the second measuring tube 102 and the fourth measuring tube, and is particularly identical to the first exciter arrangement. The second exciter arrangement 142 is positioned at the vertexes of the second and fourth measuring tubes in the measuring tube transverse plane (for the sake of clarity, the exciter arrangements are not shown in FIG. 1d).

By feeding the plunger coils with alternating current signals of suitable frequency and phase position, the measuring tubes are excited to oscillate, wherein the oscillations are coupled via the first oscillating coupler 212 between the first measuring tube 101 and the second measuring tube 102, and the second vibration coupler 234 between the third measuring tube 103 and the fourth measuring tube 104.

In the first, in-phase oscillator vibration mode, the two exciter arrangements have to exert an attracting force in phase opposition. In the case of the second, inversely phased oscillator vibration mode, the two exciter arrangements must exert an attracting force in phase.

To detect the oscillations between the first measuring tube 101 and the third measuring tube 103, two electrodynamic sensor arrangements 151 are arranged symmetrically with respect to the measuring tube transverse plane between the first measuring tube 101 and the third measuring tube 103, each having one plunger coil on one tube and one plunger on the other tube. Accordingly, to detect the oscillations between the second measuring tube 102 and the fourth measuring tube 104, two electrodynamic sensor arrangements 152 are arranged symmetrically to the measuring tube transverse plane between the second measuring tube 102 and the fourth measuring tube 104, each having one plunger coil on one tube and one plunger on the other tube. Details are known to the person skilled in the art, and need not be explained here. (For the sake of clarity, the positions of the exciter arrangement and the sensor arrangements were shown only in FIG. 1b and provided with reference numerals).

The invention claimed is:

1. A measurement sensor of the vibrational type for measuring the density and/or mass flow of a medium, the sensor comprising:
   a first oscillator, including:
      a first measuring tube having a first measuring tube center line extending in mirror symmetry relative to a measuring tube transverse plane, the first measuring tube configured to oscillate in a first bending vibration mode in mirror symmetry relative to the first measuring tube transverse plane, wherein the first measuring tube is bent in a rest position,
      wherein a first measuring tube longitudinal plane is defined in which the integral over the square of a distance between the first measuring tube center line and the first measuring tube longitudinal plane is minimal, and wherein the first measuring tube in the first bending vibration mode oscillates substantially perpendicularly to the first measuring tube longitudinal plane;
      a second measuring tube having a second measuring tube center line extending in mirror symmetry relative to the measuring tube transverse plane, the second measuring tube configured to oscillate in the first bending vibration mode in mirror symmetry relative to the first measuring tube transverse plane, wherein the first measuring tube and the second measuring tube are bent in the same direction in the rest position,
      wherein a second measuring tube longitudinal plane is defined in which the integral over the square of a distance between the second measuring tube center line and the second measuring tube longitudinal plane is minimal, and wherein the second measuring tube in the first bending vibration mode oscillates substantially perpendicularly to the second measuring tube longitudinal plane; and
      a first resilient vibration coupler adapted to couple the first measuring tube and the second measuring tube together;
   a second oscillator, including:
      a third measuring tube having a third measuring tube center line extending in mirror symmetry relative to the measuring tube transverse plane, the third measuring tube configured to oscillate in the first bending vibration mode in mirror symmetry relative to the measuring tube transverse plane, wherein the third measuring tube is bent in the rest position,
      wherein a third measuring tube longitudinal plane is defined in which the integral over the square of a distance between the third measuring tube center line and the third measuring tube longitudinal plane is minimal, and wherein the third measuring tube in the first bending vibration mode oscillates substantially perpendicularly to the third measuring tube longitudinal plane;
      a fourth measuring tube having a fourth measuring tube center line extending in mirror symmetry relative to the measuring tube transverse plane, the fourth measuring tube configured to oscillate in the first bending vibration mode in mirror symmetry relative to the measuring tube transverse plane, wherein the third measuring tube and the fourth measuring tube are bent in the same direction in the rest position,
      wherein a fourth measuring tube longitudinal plane is defined in which the integral over the square of a distance between the fourth measuring tube center line and the fourth measuring tube longitudinal plane is minimal, wherein the fourth measuring tube oscillates in the first bending vibration mode substantially perpendicularly to the fourth measuring tube longitudinal plane; and
      a second resilient vibration coupler adapted to couple the third measuring tube and the fourth measuring tube together;
   at least one exciter; and
   at least two vibration sensors, wherein:
      the measurement sensor has a measurement sensor longitudinal plane extending perpendicularly to the measuring tube transverse plane, wherein the first measuring tube center line extends in mirror symmetry relative to the third measuring tube center line with respect to the measurement sensor longitudinal plane, wherein the second measuring tube center line extends in mirror symmetry relative to the fourth measuring tube center line with respect to the measurement sensor longitudinal plane, wherein the measurement sensor longitudinal plane extends between the first measuring tube and the second measuring tube, wherein the measurement sensor longitudinal plane extends between the third measuring tube and the fourth measuring tube;
      the at least one exciter is configured to excite oscillator vibrations of the first oscillator and second oscillator with respect to one another;
      the measurement sensor has a first natural frequency for a vibration mode in which the first and second measuring tubes of the first oscillator oscillate approximately in phase with each other in the first bending vibration mode and in which the third and fourth measuring tubes of the second oscillator oscillate approximately in phase with each other in the first bending vibration mode;
      the measurement sensor has a second natural frequency for a vibration mode in which the first and second measuring tubes of the first oscillator oscillate approximately in phase opposition and in which the third and fourth measuring tubes of the second oscillator oscillate approximately in phase opposition in the first bending vibration mode; and
      the second natural frequency is greater than the first natural frequency.

2. The measurement sensor of claim 1, wherein the first vibration coupler has a first effective spring constant, wherein the second vibration coupler has a second effective spring constant, wherein the second spring constant differs from the first spring constant by not more than 6%.

3. The measurement sensor of claim 1, wherein the second natural frequency is higher than the first natural frequency by at least 4%.

4. The measurement sensor of claim 1, wherein:
without the first and second vibration couplers, the first measuring tube and the third measuring tube have a first effective measuring tube natural frequency for the first bending vibration mode when oscillating against each other;
without the first and second vibration couplers, the second measuring tube and the fourth measuring tube have a second effective measuring tube natural frequency for the first bending vibration mode when oscillating against each other;
the first and second measuring tube natural frequencies differ by no more than 8% from an arithmetic mean thereof.

5. The measurement sensor of claim 1, wherein first, second, third and fourth measuring tube longitudinal planes are inclined relatively to the measurement sensor longitudinal plane by no more than 8%.

6. The measurement sensor of claim 1, wherein at least one of the first and second vibration couplers is connected to the corresponding measuring tubes coupled thereby at attachment points that are arranged symmetrically with respect to the measuring tube transverse plane.

7. The measurement sensor of claim 1, wherein a rest position distance of the attachment points of either the first or second vibration coupler to the corresponding measuring tubes coupled by the vibration coupler at temperatures between 20° C. and 80° C. has a change coefficient that differs not more than 50% from the thermal expansion coefficient of the material of the vibration coupler.

8. The measurement sensor of claim 1, further comprising:
an inlet-side collector;
an outlet-side collector, wherein all the measuring tubes are fluidically combined with the inlet-side collector on the inlet side and with the outlet-side collector on the outlet side, and wherein the inlet-side and outlet-side collectors are configured to function as node plates; and
a carrier body rigidly connecting the inlet-side collector and the outlet-side collector.

9. The measurement sensor of claim 1, wherein each measuring tube has an inlet side and an outlet side, the measurement sensor further comprising:
at least one node plate each on the inlet side and the outlet side, wherein all the measuring tubes are connected to each other on the inlet side and the outlet side at least via at least one node plate such that all the measuring tube longitudinal planes are symmetrical with respect to the measurement sensor longitudinal plane.

10. The measurement sensor of claim 1, wherein each of the vibration couplers couples only two measuring tubes to one another.

11. The measurement sensor of claim 1, wherein the first and second vibration couplers are not directly connected to each other.

* * * * *